United States Patent
Tien et al.

(10) Patent No.: US 9,827,697 B2
(45) Date of Patent: Nov. 28, 2017

(54) SYSTEMS AND METHODS FOR CURING COMPLEX FIBER-REINFORCED COMPOSITE STRUCTURES

(71) Applicant: The Boeing Company, Huntington Beach, CA (US)

(72) Inventors: Allan Tien, Seattle, WA (US); Samson Souksamrane, Seattle, WA (US); Sahrudine Apdalhaliem, Seattle, WA (US)

(73) Assignee: The Boeing Company, Chicago, IL (US)

( * ) Notice: Subject to any disclaimer, the term of this patent is extended or adjusted under 35 U.S.C. 154(b) by 551 days.

(21) Appl. No.: 14/473,184

(22) Filed: Aug. 29, 2014

(65) Prior Publication Data

US 2016/0059449 A1    Mar. 3, 2016

(51) Int. Cl.
*B29C 43/52* (2006.01)
*B29C 35/02* (2006.01)
*B29C 43/56* (2006.01)
*B29C 70/88* (2006.01)
*B29K 105/08* (2006.01)
*B29K 307/04* (2006.01)
*B29L 9/00* (2006.01)

(52) U.S. Cl.
CPC .............. *B29C 43/52* (2013.01); *B29C 35/02* (2013.01); *B29C 35/0227* (2013.01); *B29C 35/0266* (2013.01); *B29C 35/0272* (2013.01); *B29C 43/56* (2013.01); *B29C 70/882* (2013.01); *B29C 35/0288* (2013.01); *B29K 2105/08* (2013.01); *B29K 2307/04* (2013.01); *B29K 2995/0013* (2013.01); *B29L 2009/00* (2013.01)

(58) Field of Classification Search
CPC ...................................... B29C 43/52
See application file for complete search history.

(56) References Cited

U.S. PATENT DOCUMENTS

| 5,542,471 A | 8/1996 | Dickinson |
| 2003/0116678 A1* | 6/2003 | Gardner .................. B64C 1/40 244/117 A |
| 2007/0175573 A1 | 8/2007 | Fox et al. |
| 2011/0101283 A1 | 5/2011 | Lu et al. |
| 2014/0231402 A1* | 8/2014 | Matsen ............... B29C 35/0227 219/212 |

OTHER PUBLICATIONS

European Patent Office, Extended European Search Report for related European patent application EP 15 18 1969, Mar. 4, 2016.
Joseph et al., "Electrical resistance curing of carbon-fibre/epoxy composites," Composites Science and Technology, vol. 60, pp. 315-319, 2000.

* cited by examiner

*Primary Examiner* — Larry Thrower
(74) *Attorney, Agent, or Firm* — Dascenzo Intellectual Property Law, P.C.

(57) ABSTRACT

Systems and methods for curing complex fiber-reinforced composite structures utilize two distinct heat sources. A first heat source is utilized for heating a complex fiber-reinforced composite structure from within an internal portion of the complex fiber-reinforced composite structure. A second heat source is utilized for heating the complex fiber-reinforced composite structure from an external surface of the complex fiber-reinforced composite structure.

22 Claims, 3 Drawing Sheets

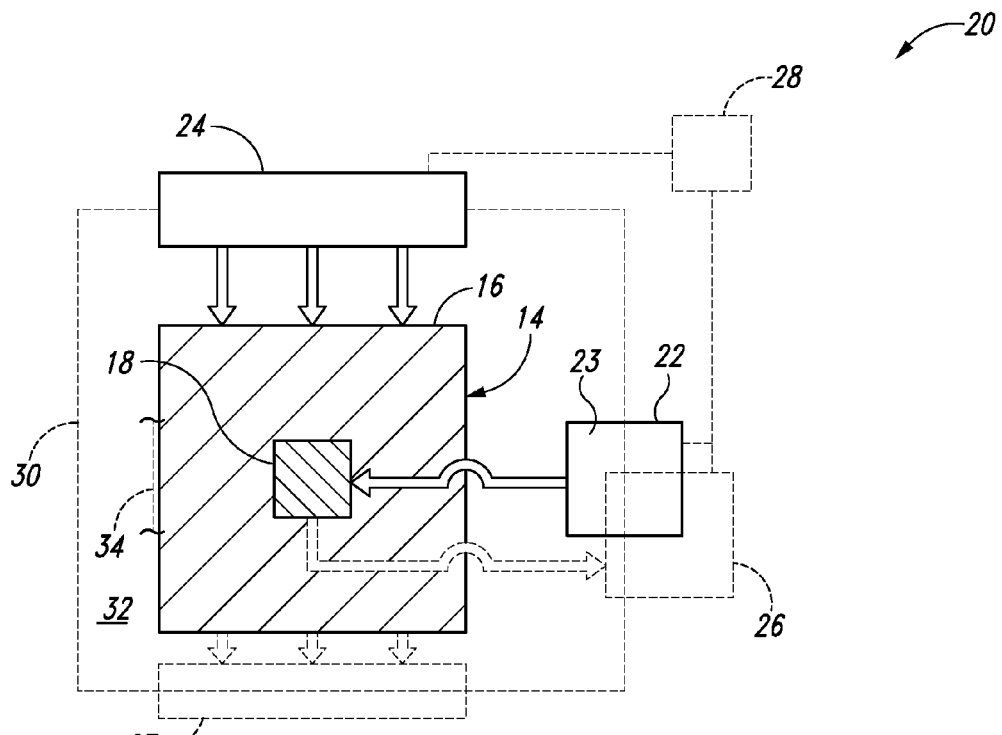
Fig. 2
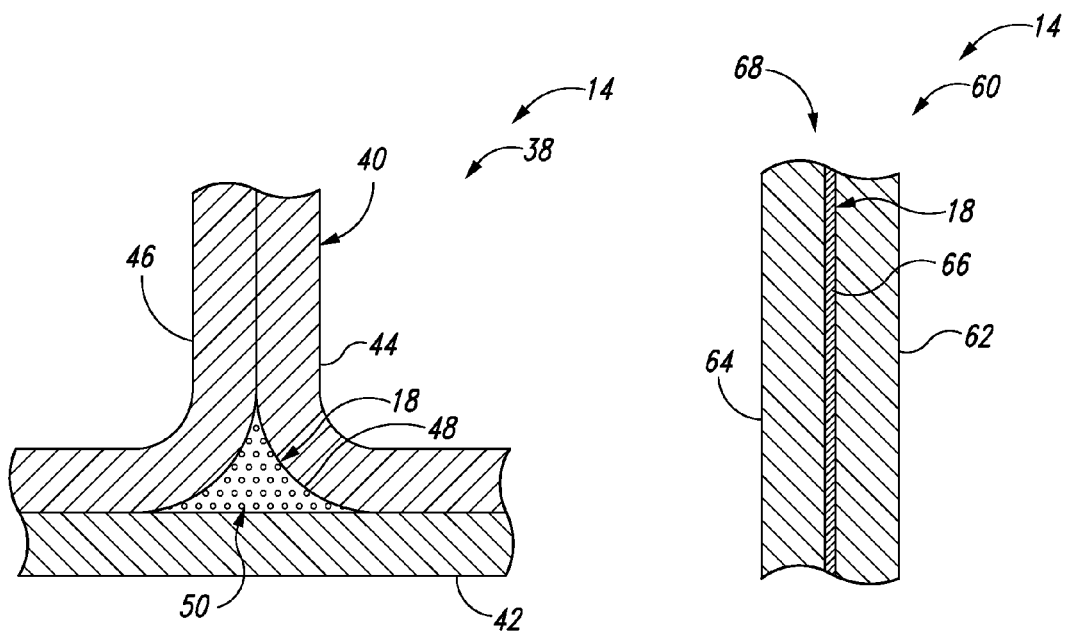
Fig. 3
Fig. 4

SYSTEMS AND METHODS FOR CURING COMPLEX FIBER-REINFORCED COMPOSITE STRUCTURES

FIELD

The present disclosure relates to curing fiber-reinforced composite structures.

BACKGROUND

Curing of fiber-reinforced composite structures that have complex geometries often results in residual internal stresses due to the thermal characteristics of composite materials. For example, historically, when a fiber-reinforced composite structure is cured within an autoclave, the structure is heated exclusively from the external surface of the structure. As heat is conducted from the external surface inward, the composite binding material expands. Then, as the structure cools, also from the external surface inward, the composite binding material shrinks. As a result of the expansion and shrinkage, internal stresses may result and remain even after the composite structure is at thermal equilibrium. Accordingly, there is a need for improved systems and methods for curing fiber-reinforced composite structures.

SUMMARY

Systems and methods for curing complex fiber-reinforced composite structures utilize two distinct heat sources. A first heat source is utilized to apply heat to an internal portion of a complex fiber-reinforced composite structure being cured for conductive heating of the complex fiber-reinforced composite structure from the internal portion. A second heat source is utilized to apply heat to an external surface of the complex fiber-reinforced composite structure being cured for conductive heating of the complex fiber-reinforced composite structure from the external surface. Some systems and methods optionally also utilize a heat sink to actively withdraw heat from the internal portion of the complex fiber-reinforced composite structure being cured to cool the complex fiber-reinforced composite structure from within the internal portion. In some systems and methods, the first heat source includes a heater that contacts an exposed portion of the internal portion of the complex fiber-reinforced composite structure being cured. In some such systems and methods that also utilize a heat sink, the heater and the heat sink share structure for applying heat to and withdrawing heat from the internal portion of the complex fiber-reinforced composite structure being cured. In some systems and methods, the second heat source includes one of an autoclave and an oven with an internal volume sized to receive the complex fiber-reinforced composite structure. In some systems and methods, the second heat source includes one or more heating pads or blankets configured to engage the external surface of the complex fiber-reinforced composite structure being cured.

BRIEF DESCRIPTION OF THE DRAWINGS

FIG. 2 is a diagram schematically representing systems for curing complex fiber-reinforced composite structures.

FIG. 3 is a cross-sectional view of an illustrative, non-exclusive example of a complex fiber-reinforced composite structure.

FIG. 4 is a cross-sectional view of another illustrative, non-exclusive example of a complex fiber-reinforced composite structure.

DESCRIPTION

Systems and methods for curing complex fiber-reinforced composite structures, methods of assembling complex fiber-reinforced composite structures, methods of assembling apparatuses with complex fiber-reinforced composite structures, and apparatuses with complex fiber-reinforced composite structures are disclosed herein. Generally, in the figures, elements that are likely to be included in a given example are illustrated in solid lines, while elements that are optional to a given example are illustrated in broken lines. However, elements that are illustrated in solid lines are not essential to all examples of the present disclosure, and an element shown in solid lines may be omitted from a particular example without departing from the scope of the present disclosure.

As used herein, a "complex fiber-reinforced composite structure" is a structure constructed of fiber-reinforced composite material and that includes at least two distinct regions having different physical and/or thermal characteristics from each other. One or more interfaces are defined between, or at the engagement or intersection of, the distinct regions. Examples of different physical characteristics include such characteristics as different fiber materials, different fiber orientations, different fiber sizes, different fiber densities, different resin materials, different layer thicknesses, different layer orientations, and different coefficient of thermal expansions. In a complex fiber-reinforced composite structure, the interface between two regions creates a thermal discontinuity between the two regions. Accordingly, when a complex fiber-reinforced composite structure is heated, such as during a curing process, the interface may affect the conduction of heat from one region to an adjacent region across the interface.

Fiber-reinforced composite structures, in general, include at least an epoxy, resin, or other polymer or binding material together with fibers, such as constructed of (but not limited to) glass fibers, carbon fibers, boron fibers, para-aramid (e.g., Kevlar®) fibers, and/or other fibers. In some examples, composite structures may be constructed of multiple layers, or plies, of fiber reinforced composite material. Accordingly, a complex fiber-reinforced composite structure may include an assembly of two or more individual segments of fiber-reinforced composite structures that are combined or joined to define an interface, as discussed above, such as with the two or more individual segments having different fiber and/or binding material characteristics, as discussed above.

Figure 1:
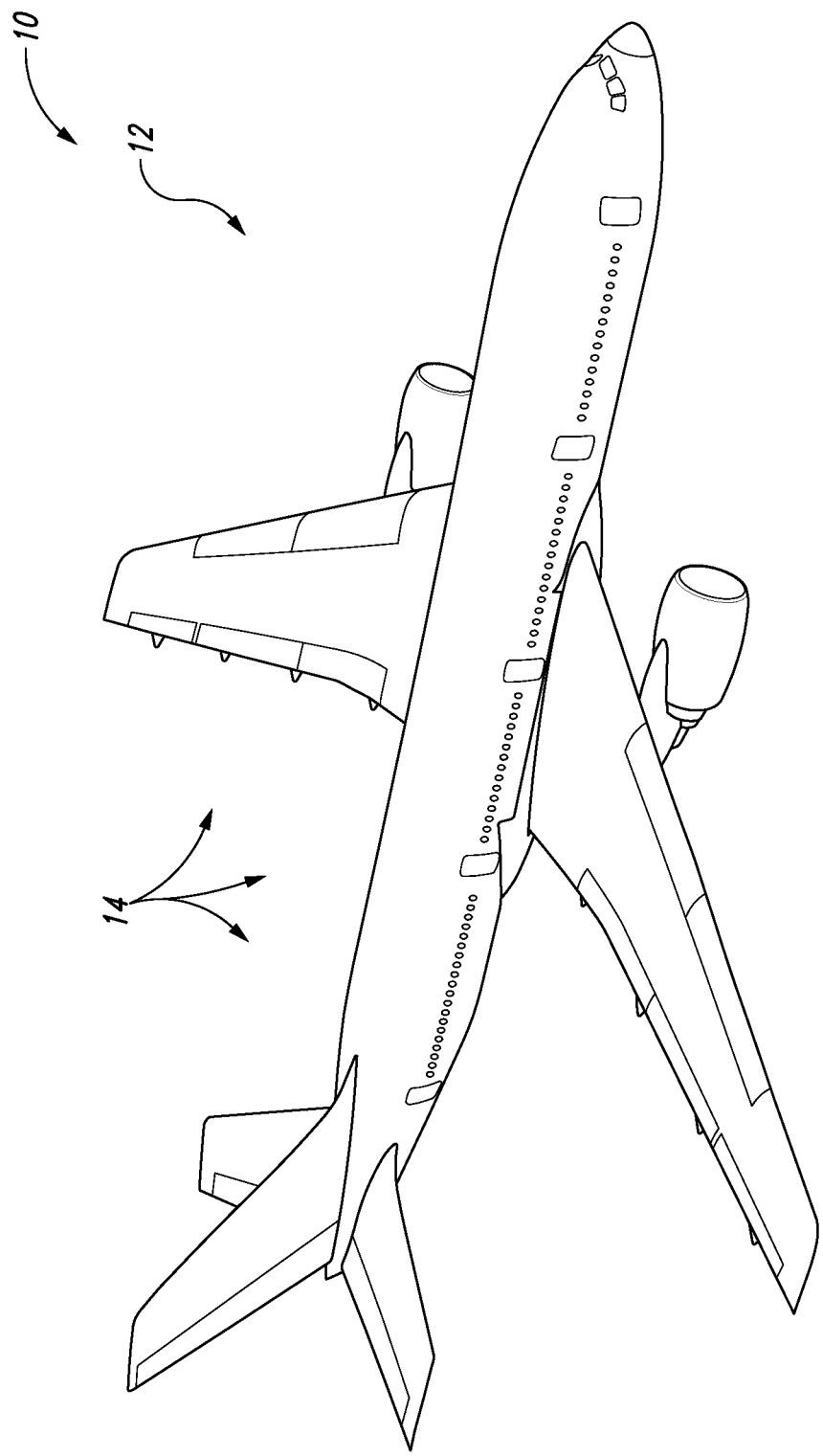
FIG. 1 is a perspective view of an illustrative, non-exclusive example of an aircraft.

Various apparatuses, including aerospace structures, are increasingly being constructed of fiber-reinforced composite materials. In FIG. 1, an example apparatus 10 in the form of an aircraft 12, for example, is schematically indicated as including various complex fiber-reinforced composite structures 14 throughout the aircraft. As illustrative and non-exclusive examples, one or more of a stringer, a stringer and skin assembly, a wing spar, a wing spar and skin assembly, a wing rib, a wing rib and spar assembly, a wing rib and skin assembly, a frame member, a frame member and skin assembly, and a joint or assembly between more than one fiber-reinforced composite part may define a complex fiber-reinforced composite structure 14.

While the example of FIG. 1 and discussions herein generally relate to aerospace structures, apparatuses 10 other than aircraft are within the scope of the present disclosure and may include complex fiber-reinforced composite structures. For example, other apparatuses that may include complex fiber-reinforced composite structures include (but are not limited to) spacecraft, watercraft, land vehicles, wind turbines, structural towers and masts, etc. Moreover, aircraft 12 may take any suitable form, including commercial aircraft, military aircraft, private aircraft, or any other suitable aircraft. While FIG. 1 illustrates aircraft 12 in the form of a fixed wing commercial aircraft, other types and configurations of aircraft are within the scope of aircraft 12 according to the present disclosure, including (but not limited to) helicopters.

FIG. 2 provides a schematic representation of illustrative, non-exclusive examples of systems 20 for curing complex fiber-reinforced composite structures 14. Systems 20 include at least a first heat source 22 and a second heat source 24 that is distinct from the first heat source. As schematically illustrated with an arrow representing heat, the first heat source 22 is configured to apply heat to an internal portion 18 of a complex fiber-reinforced composite structure 14 to be cured for conductive heating of the complex fiber-reinforced composite structure from the internal portion outward. As also schematically illustrated with an arrow representing heat, the second heat source 24 is configured to apply heat to an external surface 16 of the complex fiber-reinforced composite structure 14 for conductive heating of the complex fiber-reinforced composite structure from the external surface inward.

The first heat source 22 may include a heater, or heat assembly, 23 configured to contact an exposed portion of the internal portion 18 of the complex fiber-reinforced composite structure 14 being cured for conductive heating of the internal portion and thus for conductive heating of the complex fiber-reinforced composite structure from the internal portion outward. Illustrative, non-exclusive examples of heaters 23 include (but are not limited to) heat pads, heat blankets, and resistive heaters, optionally powered by such commercial power supplies as HEATCON™ 6500, AGILENT™ U8001A, or HP™ 6012B.

Generally, the second heat source 24 is a heat source that is configured to heat an entirety of the external surface 16 of the complex fiber-reinforced composite structure being cured. Illustrative, non-exclusive examples of second heat sources 24 include (but are not limited to) an autoclave, an oven, and heating pads or blankets. In FIG. 2 an autoclave or oven 30 having an internal volume 32 sized to receive a complex fiber-reinforced composite structure 14 to be cured is schematically illustrated. As also optionally illustrated in FIG. 2, one or more heating pads or blankets 34 may be engaged with the external surface 16 to heat the complex fiber-reinforced composite structure being cured from the external surface inward.

As optionally illustrated in FIG. 2, some systems 20 additionally may include a heat sink 26 that is configured to actively withdraw heat from the internal portion 18 of the complex fiber-reinforced composite structure 14 to cool the complex fiber-reinforced composite structure from within the internal portion. By actively withdraw heat, it is meant that the heat sink is a mechanism specifically designed and intended to withdraw heat from the complex fiber-reinforced composite structure being cured via conduction, as opposed to merely being an ambient environment at a lower temperature. In FIG. 2, the optional heat sink 26 is illustrated in an overlapping relationship with the first heat source 22, schematically representing that the first heat source or associated heater share structure for both applying heat to and withdrawing heat from the internal portion of the complex fiber-reinforced composite structure being cured. In fact, in some examples, the heat sink and the first heat source optionally may be the same mechanism or tool, but operative to selectively heat and to selectively cool, depending on user preference or automation of a system 20.

As also optionally illustrated in FIG. 2, some systems 20 additionally may include a cooling device 27 that is configured to withdraw heat from the external surface 16 of the complex fiber-reinforced composite structure 14, for example, to cool the complex fiber-reinforced composite structure from the external surface and/or to maintain a desired temperature of the external surface, or portion thereof, while the first heat source 22 is actively heating the internal portion 18. As an illustrative non-exclusive example, the cooling device may utilize convection and may include one or more of a fan or an air conditioner. In FIG. 2, the optional cooling device 27 is illustrated in an overlapping relationship with the optional autoclave or oven 30, schematically representing that the cooling device optionally may be integral to, a component of, and/or utilized with an autoclave or oven, such as by providing convective processes within the internal volume 32 thereof.

While FIG. 2 very schematically illustrates a complex fiber-reinforced composite structure 14 having an internal portion 18, FIGS. 3 and 4 provide somewhat less schematic illustrative, non-exclusive examples of complex fiber-reinforced composite structures 14. For example, in FIG. 3 a complex fiber-reinforced composite structure 38 represents in cross-section a complex fiber-reinforced composite structure 14 in the form of a spar 40 operatively coupled to a skin 42 and having a radius filler, or noodle, 48 defining an internal portion between the spar and the skin, with the remainder of the complex-fiber reinforced composite material optionally described as an external portion of the complex fiber-reinforced composite material. For example, the spar may represent a wing spar in an aerospace application. More specifically, the spar is illustrated as being defined by two sheets, or sheet portions, 44, 46 that are operatively coupled to each other and to the skin 42, collectively defining an external portion, and with the radius filler 48 defining the internal portion and filling the space between the sheet portions 44, 46 and the skin 42. Radius fillers are structures that are used in applications such as spars, stringers, frame members, and the like coupled to skins of aircraft, for example, to fill voids that are a result of two composite structures being joined together, such as at a bend in a sheet of composite material, as in the example of FIG. 3, or at the termination, or edge, of a sheet of composite material on another sheet of composite material, such as a skin.

With continued reference to the example of FIG. 3, the internal portion 18 of a complex fiber-reinforce composite structure 14, such as in the form of a noodle 48, may include heat conductive fibers 50, whose ends are exposed. Accordingly, in a system 20, the first heat source 22 may be configured to apply heat to the exposed ends of the heat conductive fibers for conduction along the lengths of the heat conductive fibers. Moreover, in a system 20 including an optional heat sink 26, the heat sink may be configured to withdraw heat from the exposed ends of the heat conductive fibers to cool the complex fiber-reinforced composite structure from within the internal portion.

As illustrative, non-exclusive examples, the heat conductive fibers 50 of an internal portion 18 of a complex fiber-reinforced composite structure 14 may be composed of one or more of carbon, pitch-based carbon, carbon nanotubes, metal, copper, and metal alloy. Additionally or alternatively, the heat conductive fibers 50 may be constructed of a material that has a higher thermal conductivity than the surrounding binding material. Additionally or alternatively, the heat conductive fibers 50 may have a thermal conductivity greater than 400 W/(m*K), greater than 700 W/(m*K), or greater than 1000 W/(m*K). Additionally or alternatively, the internal portion 18, as a whole, may have such examples of thermal conductivity.

Some complex fiber-reinforced composite structures 14 may be described as having an elongate body with a longitudinal axis, such as corresponding to a length of a spar, a stringer, or a frame member, and with the heat conductive fibers 50 generally being aligned with the longitudinal axis. Accordingly, when the first heat source 22 applies heat to the exposed ends of the heat conductive fibers 50, heat is conducted along the lengths of the heat conductive fibers to heat the internal portion 18 and thus to heat the complex fiber-reinforced composite structure 14 being cured from within. In some complex fiber-reinforced composite structures 14, fibers outside of the internal portion 18 may not be generally or substantially aligned with the longitudinal axis of the complex fiber-reinforced composite structure, for example, thereby defining one example of a difference in physical characteristics and an interface between two regions of the complex fiber-reinforced composite structure. Additionally or alternatively, the heat conductive fibers 50 of an internal portion 18 may be composed of a material that is different than the fibers within a remainder of the complex fiber-reinforced composite structure 14, thereby defining another example of a difference in physical characteristics and an interface between two regions of the complex fiber-reinforced composite structure.

Turning to the illustrative, non-exclusive example of the complex fiber-reinforced composite structure 60 illustrated in FIG. 4, a complex fiber-reinforced composite structure 14 additionally or alternatively may include a plurality of layers 68 of fiber-reinforced composite material, with the internal portion 18 being defined by at least one internal layer 66 of the plurality of layers 68, and with the external portion being defined by one or more external layers 62, 64 on opposing sides of the internal portion 18.

Returning to FIG. 2, systems 20 optionally also may include a controller 28 that is configured, or programmed, to control timing of the application of heat to the complex fiber-reinforced composite structure 14 from the first heat source 22 and timing of the application of heat to the complex fiber-reinforced composite structure from the second heat source 24. Additionally, the controller 28 may be configured, or programmed, to actively monitor temperatures of one or more regions of the complex fiber-reinforced composite structure 14 being cured, and based at least in part on such monitoring, actively control the timing of the application of heat to the complex fiber-reinforced composite structure from the first heat source and the timing of the application of heat to the complex fiber-reinforced composite structure from the second heat source. Controller 28 may include any suitable structure or structures that may be adapted, configured, designed, constructed, and/or programmed to automatically control, or selectively control via a user, the operation of a system 20, including the first heat source 22 and/or the second heat source 24. As illustrative, non-exclusive examples, a controller 28 may include and/or be one or more of an electronic controller, a dedicated controller, a special-purpose controller, a personal computer, a display device, a logic device, a memory device, instrumentation, sensors, including temperature sensors, etc. In addition, controller 28 may be programmed to perform one or more algorithms to automatically control the operation of a system 20. This may include algorithms that may be based upon and/or that may cause controller 28 to direct system 20 to perform a method 102 according to the present disclosure.

Figure 5:
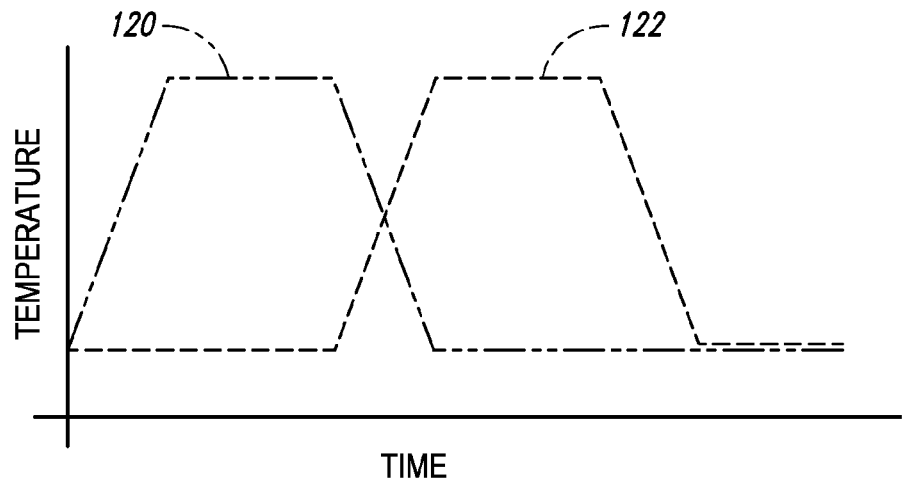
FIG. 5 is a chart graphically representing an illustrative, non-exclusive example of timing associated with curing complex fiber-reinforced composite structures.

As an illustrative, non-exclusive example and with reference to FIG. 5 with the temperature of the internal portion 18 represented by the dash-dot-dot line 120 and with the temperature of the external surface 16 represented by the dashed line 122, the controller 28 may be programmed to initiate heating of the complex fiber-reinforced composite structure 14 with the first heat source 22 prior in time to initiation of heating of the complex fiber-reinforced composite structure 14 with the second heat source 24. FIG. 5 additionally or alternatively may schematically represent the application and/or withdrawal of heat to and/or from the internal portion and the external surface in relation to time and not merely the temperature of the internal portion and the external surface over time. For example, where the initial portion of line 122 is flat, optionally representing no application of heat to the external surface, the temperature of the external surface may in fact be increasing over this period due to the conduction of heat from the internal portion.

Additionally or alternatively, the controller 28 may be programmed to cease heating of the complex fiber-reinforced composite structure with the first heat source prior in time to cessation of heating of the complex fiber-reinforced composite structure with the second heat source. Additionally or alternatively, the controller may be programmed to cease heating of the complex fiber-reinforced composite structure with the first heat source prior to initiation of heating the complex fiber-reinforced composite structure with the second heat source. Additionally or alternatively, the controller may be programmed to cease heating of the complex fiber-reinforced composite structure with the first heat source at the same or approximately the same time as initiation of heating the complex fiber-reinforced composite structure with the second heat source.

Additionally or alternatively, in example of systems 20 that include an optional heat sink 26, the controller 28 may be programmed to initiate withdrawal of heat from the complex fiber-reinforced composite structure 14 with heat sink 26 prior to initiation of heating the complex fiber-reinforced composite structure with the second heat source 24. Additionally or alternatively, the controller may be programmed to initiate withdrawal of heat from the complex fiber-reinforced composite structure with the heat sink at the same or approximately the same time as initiation of heating the complex fiber-reinforced composite structure with the second heat source. Additionally or alternatively, the controller may be programmed to initiate withdrawal of heat from the complex fiber-reinforced composite structure with the heat sink at a moment in time after initiation of heating the complex fiber-reinforced composite structure with the second heat source 24. Other examples also are within the scope of the present disclosure, and FIG. 5 illustrates just one example that may be implemented with systems and methods according to the present disclosure.

Additionally or alternatively, in examples of systems 20 that include an optional cooling device 27, the controller 28 may be programmed to withdraw heat from the complex fiber-reinforced composite structure 14 via the external surface 16 with cooling device 27 during a period in which the first heat source 22 is heating the internal portion 18.

Figure 6:
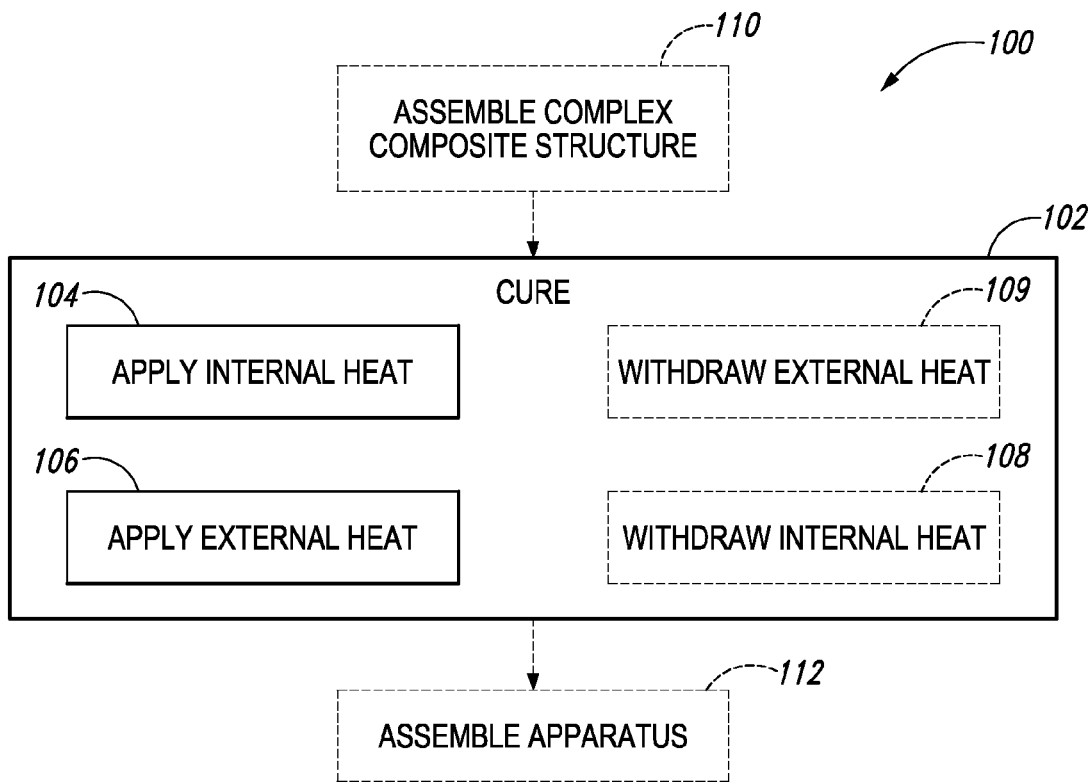
FIG. 6 is a flowchart schematically representing methods for curing complex fiber-reinforced composite structures and methods for assembling composite apparatuses.

FIG. 6 schematically provides a flowchart that represents illustrative, non-exclusive examples of methods 100 according to the present disclosure. In FIG. 6, some steps are illustrated in dashed boxes indicating that such steps may be optional or may correspond to an optional version of a method according to the present disclosure. That said, not all methods according to the present disclosure are required to include the steps illustrated in solid boxes. The methods and steps illustrated in FIG. 6 are not limiting and other methods and steps are within the scope of the present disclosure, including methods having greater than or fewer than the number of steps illustrated, as understood from the discussions herein. In the following discussion, reference is made to the component parts of systems 20 and complex fiber-reinforced composite structures, including utilization of corresponding reference numerals thereof; however, methods 100 are not limited to being implemented with and/or by systems 20 according to the present disclosure.

As illustrated in solid boxes in FIG. 6, a method 102 of curing a complex fiber-reinforced composite structure 14 includes applying 104 heat from a first heat source 22 to an internal portion 18 of a complex fiber-reinforced composite structure 14 for conductive heating of the complex fiber-reinforced composite structure from the internal portion, and applying 106 heat from a second heat source 24 distinct from the first heat source 22 to an external surface 16 of the complex fiber-reinforced composite structure 14 for conductive heating of the complex fiber-reinforced composite structure from the external surface. While the applying 106 is schematically illustrated below the applying 104, methods 102 are not limited to application of heat from the first heat source necessarily occurring or being initiated prior in time to the application of heat from the second heat source.

In some methods 102, the applying 104 may include contacting an exposed portion of the internal portion 18 of the complex fiber-reinforced composite structure 14 with the first heat source 22 for conductive heating of the internal portion 18, and thus for heating of the complex fiber-reinforced composite structure from within.

In some methods 102, such as in connection with the internal portion of a complex fiber-reinforced composite structure including heat conductive fibers 50, the applying 104 may include applying heat to exposed ends of the heat conductive fibers 50 for conduction along lengths of the heat conductive fibers within the internal portion, and thus for conductive heating of the complex fiber-reinforced composite structure from the internal portion.

As schematically and optionally illustrated in FIG. 6, some methods 102 also may include following the applying 104, actively withdrawing 108 with a heat sink 26 heat from the internal portion 18 of the complex fiber-reinforced composite structure 14 being cured to cool the complex fiber-reinforced composite structure from within the internal portion. In some such methods 102, the withdrawing 108 may include withdrawing heat from the ends of the heat conductive fibers 50 to cool the complex fiber-reinforced composite structure from the internal portion.

In some methods 102, the applying 104 may be initiated prior in time to the applying 106. Additionally or alternatively, the applying 104 may be ceased prior in time to ceasing the applying 106. Additionally or alternatively, the applying 104 may be ceased prior to initiation of the applying 106. Additionally or alternatively, the applying 104 may be ceased at the same or approximately the same time as initiation of the applying 106. Additionally or alternatively, in methods 102 that include optional withdrawing 108, the withdrawing 108 may be initiated prior to initiation of the applying 106. Additionally or alternatively, the withdrawing 108 may be initiated at the same or approximately the same time as initiation of the applying 106. Additionally or alternatively, some methods 102 further include actively monitoring temperatures of one or more regions of the complex fiber-reinforced composite structure, and based at least in part on the actively monitoring, actively controlling timing of the applying 104, the applying 106, and optionally the withdrawing 108.

As schematically and optionally illustrated in FIG. 6, some methods 102 also may include withdrawing 109 with a cooling device 27 heat from the complex fiber-reinforced composite structure 14 via the external surface 16 concurrently with applying 104. In some such methods 102, the withdrawing 109 may be performed to maintain a desired temperature of the external surface during the applying 104. In some such methods 102, the withdrawing 109 may include withdrawing heat via convection.

Methods 100 also may include assembling 110 a complex fiber-reinforced composite structure 14 prior to curing 102, as schematically indicated in FIG. 6. That is, assembling 110 may include constructing a complex fiber-reinforced composite structure 14 that includes at least two regions with an interface between regions, and optionally including an internal portion 18, as discussed herein.

Methods 100 also may include following curing 102, assembling 112 an apparatus 10 with one or more complex fiber-reinforced composite structures 14.

Illustrative, non-exclusive examples of inventive subject matter according to the present disclosure are described in the following enumerated paragraphs:

A. A system for curing complex fiber-reinforced composite structures, the system comprising:

a first heat source configured to apply heat to an internal portion of a complex fiber-reinforced composite structure for conductive heating of the complex fiber-reinforced composite structure from the internal portion; and a second heat source distinct from the first heat source configured to apply heat to an external surface of the complex fiber-reinforced composite structure for conductive heating of the complex fiber-reinforced composite structure from the external surface.

A1. The system of paragraph A, further comprising:

a heat sink configured to actively withdraw heat from the internal portion of the complex fiber-reinforced composite structure to cool the complex fiber-reinforced composite structure from within the internal portion.

A2. The system of any of paragraphs A-A1, wherein the second heat source includes one of an autoclave and an oven with an internal volume sized to receive the complex fiber-reinforced composite structure.

A3. The system of any of paragraphs A-A2, wherein the second heat source includes one or more heating pads or blankets configured to engage the external surface.

A4. The system of any of paragraphs A-A3, wherein the first heat source includes a heater configured to contact an exposed portion of the internal portion of the complex fiber-reinforced composite structure for conductive heating of the internal portion.

A4.1. The system of paragraph A4 when depending from paragraph A1, wherein the heater and the heat sink share structure for applying heat to and withdrawing heat from the internal portion of the complex fiber-reinforced composite structure.

A5. The system of any of paragraphs A-A4.1, further comprising the complex fiber-reinforced composite structure.

A5.1. The system of paragraph A5, wherein the complex fiber-reinforced composite structure includes at least two regions having different physical characteristics from each other, and wherein the internal portion of the complex fiber-reinforced composite structure defines at least a portion of an interface between the at least two regions.

A5.1.1. The system of paragraph A5.1, wherein the different physical properties include one or more of different fiber material, different fiber orientation, different fiber size, different fiber density, different resin material, different layer thickness, different layer orientation, and different coefficient of thermal expansion.

A5.2. The system of any of paragraphs A5-A5.1.1, wherein the complex fiber-reinforced composite structure includes at least two regions having different thermal characteristics from each other, and wherein the internal portion of the complex fiber-reinforced composite structure includes one of the at least two regions.

A5.3. The system of any of paragraphs A5-A5.2, wherein the complex fiber-reinforced composite structure includes at least one interface between two regions, wherein the interface creates a thermal discontinuity between the two regions, and wherein the internal portion of the complex fiber-reinforced composite structure includes one of the two regions.

A5.4. The system of any of paragraphs A5-A5.3, wherein the internal portion of the complex fiber-reinforced composite structure includes a radius filler.

A5.5. The system of any of paragraphs A5-A5.4, wherein the complex fiber-reinforced composite structure includes at least two sheets of fiber-reinforced composite material that define an/the interface.

A5.6. The system of any of paragraphs A5-A5.5, wherein the complex fiber-reinforced composite structure includes at least two sheets of fiber-reinforced composite material and a radius filler of fiber-reinforced composite material positioned between the at least two sheets.

A5.7. The system of any of paragraphs A5-A5.6, wherein the complex fiber-reinforced composite structure includes a plurality of layers of fiber-reinforced composite material, and wherein the internal portion of the complex fiber-reinforced composite structure includes at least one layer of the plurality of layers.

A5.8. The system of any of paragraphs A5-A5.7, wherein the complex fiber-reinforced composite structure includes one or more of a stringer, a stringer and skin assembly, a wing spar, a wing spar and skin assembly, a wing rib, a wing rib and spar assembly, a wing rib and skin assembly, a frame member, a frame member and skin assembly, and a joint or assembly between more than one fiber-reinforced composite part.

A5.9 The system of any of paragraphs A5-A5.8, wherein the internal portion includes heat conductive fibers, and wherein the first heat source is configured to apply heat to ends of the heat conductive fibers for conduction along lengths of the heat conductive fibers within the internal portion for conductive heating of the complex fiber-reinforced composite structure from the internal portion.

A5.9.1. The system of paragraph A5.9 when depending from paragraph A1, wherein the heat sink is configured to withdraw heat from the ends of the heat conductive fibers to cool the complex fiber-reinforced composite structure from the internal portion.

A5.9.2. The system of any of paragraphs A5.9-A5.9.1, wherein the heat conductive fibers are composed of one or more of carbon, pitch-carbon, carbon nanotubes, metal, copper, metal alloy, and material having a thermal conductivity greater than 400 W/(m*K), greater than 700 W/(m*K), or greater than 1000 W/(m*K).

A5.9.3. The system of any of paragraphs A5.9-A5.9.2, wherein the complex fiber-reinforced composite structure has a longitudinal axis, and wherein the heat conductive fibers are generally aligned with the longitudinal axis.

A5.9.3.1. The system of paragraph A5.9.3, wherein fibers outside of the internal portion of the complex fiber-reinforced composite structure are generally aligned with, are not generally aligned with, or are not substantially generally aligned with the longitudinal axis.

A5.9.4. The system of any of paragraphs A5.9-A5.9.3.1, wherein the heat conductive fibers are composed of a material different than fibers within a remainder of the complex fiber-reinforced composite structure.

A6. The system of any of paragraphs A-A5.9.4, further comprising:
a cooling device configured to withdraw heat from the external surface of the complex fiber-reinforced composite structure to maintain a desired temperature of the external surface.

A7. The system of any of paragraphs A-A6, further comprising:
a controller programmed to control timing of the application of heat to the complex fiber-reinforced composite structure from the first heat source and timing of the application of heat to the complex fiber-reinforced composite structure from the second heat source.

A7.1. The system of paragraph A7, wherein the controller is programmed to initiate heating of the complex fiber-reinforced composite structure with the first heat source prior in time to initiation of heating of the complex fiber-reinforced composite structure with the second heat source.

A7.2. The system of any of paragraphs A7-A7.1, wherein the controller is programmed to cease heating of the complex fiber-reinforced composite structure with the first heat source prior in time to cessation of heating of the complex fiber-reinforced composite structure with the second heat source.

A7.3. The system of any of paragraphs A7-A7.2, wherein the controller is programmed to cease heating of the complex fiber-reinforced composite structure with the first heat source prior to initiation of heating the complex fiber-reinforced composite structure with the second heat source.

A7.4. The system of any of paragraphs A7-A7.2, wherein the controller is programmed to cease heating of the complex fiber-reinforced composite structure with the first heat source at the same or approximately the same time as initiation of heating the complex fiber-reinforced composite structure with the second heat source.

A7.5. The system of any of paragraphs A7-A7.4 when depending from paragraph A1, wherein the controller is programmed to initiate withdrawal of heat from the complex fiber-reinforced composite structure with the heat sink prior to initiation of heating the complex fiber-reinforced composite structure with the second heat source.

A7.6. The system of any of paragraphs A7-A7.4 when depending from paragraph A1, wherein the controller is programmed to initiate withdrawal of heat from the complex fiber-reinforced composite structure with the heat sink at the same or approximately the same time as initiation of heating the complex fiber-reinforced composite structure with the second heat source.

A7.7. The system of any of paragraphs A7-A7.6 when depending from paragraph A6, wherein the controller is configured to direct the cooling device to withdraw heat from the external surface while the first heat source is heating the internal portion.

A7.8. The system of any of paragraphs A7-A7.7, wherein the controller is programmed to actively monitor temperatures of one or more regions of the complex fiber-reinforced composite structure, and based at least in part on such monitoring, actively control the timing of the application of heat to the complex fiber-reinforced composite structure from the first heat source and the timing of the application of heat to the complex fiber-reinforced composite structure from the second heat source.

A8. The system of any of paragraphs A-A7.8 configured to perform at least in part the method of any of paragraphs B-B23.

A9. The use of the system of any of paragraphs A-A8.

B. A method for curing complex fiber-reinforced composite structures, the method comprising:

applying heat from a first heat source to an internal portion of a complex fiber-reinforced composite structure for conductive heating of the complex fiber-reinforced composite structure from the internal portion; and applying heat from a second heat source distinct from the first heat source to an external surface of the complex fiber-reinforced composite structure for conductive heating of the complex fiber-reinforced composite structure from the external surface.

B1. The method of paragraph B, further comprising:

following the applying heat from the first heat source, actively withdrawing heat with a heat sink from the internal portion of the complex fiber-reinforced composite structure to cool the complex fiber-reinforced composite structure from within the internal portion.

B2. The method of any of paragraphs B-B1, wherein the second heat source includes one of an autoclave and an oven with an internal volume sized to receive the complex fiber-reinforced composite structure.

B3. The method of any of paragraphs B-B2, wherein the second heat source includes one or more heating pads or blankets configured to engage the external surface.

B4. The method of any of paragraphs B-B3, wherein the applying heat from the first heat source includes contacting an exposed portion of the internal portion of the complex fiber-reinforced composite structure with the first heat source for conductive heating of the internal portion.

B4.1. The method of paragraph B4 when depending from paragraph B1, wherein the first heat source and the heat sink share structure for applying heat to and withdrawing heat from the internal portion of the complex fiber-reinforced composite structure.

B5. The method of any of paragraphs B-B4.1, wherein the complex fiber-reinforced composite structure includes at least two regions having different physical characteristics from each other, and wherein the internal portion of the complex fiber-reinforced composite structure defines at least a portion of an interface between the at least two regions.

B5.1. The method of paragraph B5, wherein the different physical properties include one or more of different fiber material, different fiber orientation, different fiber size, different fiber density, different resin material, different layer thickness, different layer orientation, and different coefficient of thermal expansion.

B6. The method of any of paragraphs B-B5.1, wherein the complex fiber-reinforced composite structure includes at least two regions having different thermal characteristics from each other, and wherein the internal portion of the complex fiber-reinforced composite structure includes one of the at least two regions.

B7. The method of any of paragraphs B-B6, wherein the complex fiber-reinforced composite structure includes at least one interface between two regions, optionally wherein the interface creates a thermal discontinuity between the two regions, and optionally wherein the internal portion of the complex fiber-reinforced composite structure includes one of the two regions.

B8. The method of any of paragraphs B-B7, wherein the internal portion of the complex fiber-reinforced composite structure includes a radius filler.

B9. The method of any of paragraphs B-B8, wherein the complex fiber-reinforced composite structure includes at least two sheets of fiber-reinforced composite material that define an/the interface.

B10. The method of any of paragraphs B-B9, wherein the complex fiber-reinforced composite structure includes at least two sheets of fiber-reinforced composite material and a radius filler of fiber-reinforced composite material positioned between the at least two sheets.

B11. The method of any of paragraphs B-B10, wherein the complex fiber-reinforced composite structure includes a plurality of layers of fiber-reinforced composite material, and wherein the internal portion of the complex fiber-reinforced composite structure includes at least one layer of the plurality of layers.

B12. The method of any of paragraphs B-B11, wherein the complex fiber-reinforced composite structure includes one or more of a stringer, a stringer and skin assembly, a wing spar, a wing spar and skin assembly, a wing rib, a wing rib and spar assembly, a wing rib and skin assembly, a frame member, a frame member and skin assembly, and a joint or assembly between more than one fiber-reinforced composite part.

B13. The method of any of paragraphs B-B12, wherein the internal portion includes heat conductive fibers, and wherein the applying heat from the first heat source includes applying heat to ends of the heat conductive fibers for conduction along lengths of the heat conductive fibers within the internal portion for conductive heating of the complex fiber-reinforced composite structure from the internal portion, optionally wherein the heat conductive fibers are constructed of a material different than fibers within a remainder of the complex fiber-reinforced composite structure.

B13.1. The method of paragraph B13 when depending from paragraph B1, wherein the withdrawing heat with the heat sink includes withdrawing heat from the ends of the heat conductive fibers to cool the complex fiber-reinforced composite structure from the internal portion.

B13.2. The method of any of paragraphs B13-B13.1, wherein the heat conductive fibers are composed of one or more of carbon, pitch-carbon, carbon nano-tubes, metal, copper, metal alloy, and material having a thermal conductivity greater than 400 W/(m*K), greater than 700 W/(m*K), or greater than 1000 W/(m*K).

B13.3. The method of any of paragraphs B13-B13.2, wherein the complex fiber-reinforced composite structure has a longitudinal axis, and wherein the heat conductive fibers are generally aligned with the longitudinal axis.

B13.3.1. The method of paragraph B13.3, wherein fibers outside of the internal portion of the complex fiber-reinforced composite structure are generally aligned with, are not generally aligned with, or are not substantially generally aligned with the longitudinal axis.

B14. The method of any of paragraphs B-B13.3.1, wherein the applying heat from the first heat source is initiated prior in time to the applying heat from the second heat source.

B15. The method of any of paragraphs B-B14, wherein the applying heat from the first heat source is ceased prior in time to ceasing the applying heat from the second heat source.

B16. The method of any of paragraphs B-B15, wherein the applying heat from the first heat source is ceased prior to initiation of the applying heat with the second heat source.

B17. The method of any of paragraphs B-B15, wherein the applying heat with the first heat source is ceased at the same or approximately the same time as initiation of the applying the heat with the second heat source.

B18. The method of any of paragraphs B1-B17 when depending from paragraph B1, wherein the withdrawing heat with the heat sink is initiated prior to initiation of the applying heat with the second heat source.

B19. The method of any of paragraphs B1-B17 when depending from paragraph B1, wherein the withdrawing heat with the heat sink is initiated at the same or approximately the same time as initiation of the applying heat with the second heat source.

B20. The method of any of paragraphs B-B19, further comprising:

withdrawing heat from the complex fiber-reinforced composite structure via the external surface, optionally concurrently with the applying heat from the first heat source and prior to the applying heat from the second heat source.

B21. The method of any of paragraphs B-B20, further comprising:

actively monitoring temperatures of one or more regions of the complex fiber-reinforced composite structure; and based at least in part on the actively monitoring, actively controlling timing of the applying heat from the first heat source and the applying heat from the second heat source.

B22. A method, comprising:

performing the method of any of paragraphs B-B21; and prior to the performing, assembling the complex fiber-reinforced composite structure.

B23. A method of assembling an apparatus, comprising:

performing the method of paragraph B22; and following the performing, assembling an apparatus including one or more fiber-reinforced composite materials, optionally wherein the apparatus includes or is a vehicle, an aerospace vehicle, or a marine vehicle.

B24. The method of any of paragraphs B-B23 performed at least in part by the system of any of paragraphs A-A8.

C. A complex fiber-reinforced composite structure, comprising: an elongate body having an internal portion constructed of fiber-reinforced composite material and an external portion constructed of fiber-reinforced composite material, wherein the internal portion includes a plurality of heat conductive fibers that extend longitudinally along the elongate body with exposed ends that are configured to be operatively coupled to a heat source for conductively heating the heat conductive fibers for at least partially curing the complex fiber-reinforced composite structure from within the elongate body.

C1. The complex fiber-reinforced composite structure, wherein the elongate body includes one or more of a stringer, a stringer and skin assembly, a wing spar, a wing spar and skin assembly, a wing rib, a wing rib and spar assembly, a wing rib and skin assembly, a frame member, a frame member and skin assembly, and a joint or assembly between more than one fiber-reinforced composite part.

C2. The complex fiber-reinforced composite structure of any of paragraphs C-C1, wherein the internal portion includes a radius filler.

C3. The complex fiber-reinforced composite structure of any of paragraphs C-C2, wherein the internal portion and the external portion have different physical characteristics from each other.

C3.1. The complex fiber-reinforced composite structure of paragraph C3, wherein the different physical properties include one or more of different fiber material, different fiber orientation, different fiber size, different fiber density, different resin material, different layer thickness, different layer orientation, and different coefficient of thermal expansion.

C4. The complex fiber-reinforced composite structure of any of paragraphs C-C3.1, wherein the internal portion and the external portion have different thermal characteristics from each other.

C5. The complex fiber-reinforced composite structure of any of paragraphs C-C4, wherein an interface between the internal portion and the external portion creates a thermal discontinuity between the two portions.

C6. The complex fiber-reinforced composite structure of any of paragraphs C-C5, wherein the elongate body includes at least two sheets of fiber-reinforced composite material that define an/the interface.

C7. The complex fiber-reinforced composite structure of any of paragraphs C-C6, wherein the elongate body includes at least two sheets of fiber-reinforced composite material and a radius filler of fiber-reinforced composite material positioned between the at least two sheets.

C8. The complex fiber-reinforced composite structure of any of paragraphs C-C7, wherein the elongate body includes a plurality of layers of fiber-reinforced composite material, and wherein the internal portion of the complex fiber-reinforced composite structure includes at least one layer of the plurality of layers.

C9. The complex fiber-reinforced composite structure of any of paragraphs C-C8, wherein the heat conductive fibers are composed of one or more of carbon, pitch-carbon, carbon nanotubes, metal, copper, metal alloy, and material having a thermal conductivity greater than 400 W/(m*K), greater than 700 W/(m*K), or greater than 1000 W/(m*K).

C10. The complex fiber-reinforced composite structure of any of paragraphs C-C9, wherein the elongate body has a longitudinal axis, and wherein the heat conductive fibers are generally aligned with the longitudinal axis.

C10.1. The complex fiber-reinforced composite structure of paragraph C10, wherein fibers within the external portion are generally aligned with, are not generally aligned with, or are not substantially generally aligned with the longitudinal axis.

C11. The complex fiber-reinforced composite structure of any of paragraphs C-C10.1, wherein the heat conductive fibers are composed of a material different than fibers within the external portion.

C12. The use of the complex fiber-reinforced composite structure of any of paragraphs C-C11.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

The invention claimed is:

1. A method for curing complex fiber-reinforced composite structures, the method comprising:
    applying heat from a first heat source to an internal portion of a complex fiber-reinforced composite structure for conductive heating of the complex fiber-reinforced composite structure from the internal portion, wherein the internal portion includes heat conductive fibers, and wherein the applying heat from the first heat source includes contacting exposed ends of the heat conductive fibers with the first heat source for conduction along lengths of the heat conductive fibers within the internal portion for conductive heating of the complex-fiber reinforced composite structure from the internal portion; and
    applying heat from a second heat source distinct from the first heat source to an external surface of the complex fiber-reinforced composite structure for conductive heating of the complex fiber-reinforced composite structure from the external surface.

2. The method of claim 1, further comprising:
    following the applying heat from the first heat source, actively withdrawing heat with a heat sink from the internal portion of the complex fiber-reinforced composite structure to cool the complex fiber-reinforced composite structure from within the internal portion.

3. The method of claim 2, wherein the first heat source and the heat sink share structure for applying heat to and withdrawing heat from the internal portion of the complex fiber-reinforced composite structure.

4. The method of claim 1, wherein the second heat source includes one of an autoclave and an oven with an internal volume sized to receive the complex fiber-reinforced composite structure.

5. The method of claim 1, wherein the second heat source includes one or more heating pads or blankets configured to engage the external surface.

6. The method of claim 1, wherein the complex fiber-reinforced composite structure includes at least two regions having different physical characteristics from each other, and wherein the internal portion of the complex fiber-reinforced composite structure defines at least a portion of an interface between the at least two regions, and wherein the different physical properties includes one or more of different fiber material, different fiber orientation, different fiber size, different fiber density, different resin material, different layer thickness, different layer orientation, and different coefficient of thermal expansion.

7. The method of claim 1, wherein the complex fiber-reinforced composite structure includes at least two regions having different thermal characteristics from each other, and wherein the internal portion of the complex fiber-reinforced composite structure includes one of the at least two regions.

8. The method of claim 1, wherein the complex fiber-reinforced composite structure includes at least one interface between two regions, wherein the interface creates a thermal discontinuity between the two regions, and wherein the internal portion of the complex fiber-reinforced composite structure includes one of the two regions.

9. The method of claim 1, wherein the internal portion of the complex fiber-reinforced composite structure is a radius filler.

10. The method of claim 1, wherein the complex fiber-reinforced composite structure includes at least two sheets of fiber-reinforced composite material and a radius filler of fiber-reinforced composite material positioned between the at least two sheets, and wherein the internal portion of the complex fiber-reinforced composite structure is the filler.

11. The method of claim 1, wherein the complex fiber-reinforced composite structure includes a plurality of layers of fiber-reinforced composite material, and wherein the internal portion of the complex fiber-reinforced composite structure is at least one layer of the plurality of layers.

12. The method of claim 1, wherein the complex fiber-reinforced composite structure includes one or more of a stringer, a stringer and skin assembly, a wing spar, a wing spar and skin assembly, a wing rib, a wing rib and spar assembly, a wing rib and skin assembly, a frame member, a frame member and skin assembly, and an assembly between more than one fiber-reinforced composite part.

13. The method of claim 1, wherein the heat conductive fibers are constructed of a material different than fibers within a remainder of the complex fiber-reinforced composite structure.

14. The method of claim 1, wherein the complex fiber-reinforced composite structure has a longitudinal axis, and wherein the heat conductive fibers are generally aligned with the longitudinal axis.

15. The method of claim 1, wherein the applying heat from the first heat source is initiated prior in time to the applying heat from the second heat source.

16. The method of claim 15, wherein the applying heat from the first heat source is ceased prior in time to ceasing the applying heat from the second heat source.

17. The method of claim 15, wherein the applying heat from the first heat source is ceased prior to initiation of the applying heat with the second heat source.

18. The method of claim 1, further comprising:
    actively monitoring temperatures of one or more regions of the complex fiber-reinforced composite structure; and
    based at least in part on the actively monitoring, actively controlling timing of the applying heat from the first heat source and the applying heat from a second heat source.

19. The method of claim 1, further comprising:
    withdrawing heat from the complex fiber-reinforced composite structure via the external surface concurrently with the applying heat from the first heat source and prior to the applying heat from the second heat source.

20. A method for curing complex fiber-reinforced composite structures, the method comprising:

applying heat from a first heat source to an internal portion of a complex fiber-reinforced composite structure having a longitudinal axis for conductive heating of the complex fiber-reinforced composite structure from the internal portion, wherein the internal portion includes heat conductive fibers generally aligned with the longitudinal axis, wherein the heat conductive fibers are constructed of a material different than fibers within a remainder of the complex fiber-reinforced composite structure, and wherein the applying heat from the first heat source includes contacting with the first heat source exposed ends of the heat conductive fibers for conduction along lengths of the heat conductive fibers within the internal portion for conductive heating of the complex fiber-reinforced composite structure from the internal portion; and applying heat from a second heat source distinct from the first heat source to an external surface of the complex fiber-reinforced composite structure for conductive heating of the complex fiber-reinforced composite structure from the external surface, wherein the second heat source includes at least one of an autoclave, an oven, a heating pad, and a heating blanket.

21. The method of claim 1, wherein the internal portion is encased within a remainder of the complex fiber-reinforced composite structure.

22. The method of claim 1, wherein, in cross-section, the internal portion is surrounded by and in contact with a remainder of the complex fiber-reinforced composite structure.

* * * * *

UNITED STATES PATENT AND TRADEMARK OFFICE
CERTIFICATE OF CORRECTION

PATENT NO. : 9,827,697 B2
APPLICATION NO. : 14/473184
DATED : November 28, 2017
INVENTOR(S) : Allan Tien, Samson Souksamrane and Sahrudine Apdalhaliem It is certified that error appears in the above-identified patent and that said Letters Patent is hereby corrected as shown below:

In the Claims

Claim 10, Column 16, Line 23, add --radius-- after "the" and before "filler".

Signed and Sealed this
Twenty-ninth Day of May, 2018

Andrei Iancu
*Director of the United States Patent and Trademark Office*